United States Patent
Turner

(10) Patent No.: US 6,680,194 B1
(45) Date of Patent: Jan. 20, 2004

(54) MERCAPTAN DEODORIZING FOR STORAGE TANKS

(75) Inventor: Jerry Turner, Sherman, IL (US)

(73) Assignee: Central Illinois Light, Co., Peoria, IL (US)

(*) Notice: Subject to any disclaimer, the term of this patent is extended or adjusted under 35 U.S.C. 154(b) by 0 days.

(21) Appl. No.: 09/621,205

(22) Filed: Jul. 21, 2000

Related U.S. Application Data

(60) Provisional application No. 60/146,499, filed on Jul. 30, 1999.

(51) Int. Cl.[7] ................................ C12M 1/04
(52) U.S. Cl. .................. 435/294.1; 435/296.1; 435/300.1; 134/166 R
(58) Field of Search ................ 435/264, 266, 435/300.1, 296.1, 294.1; 422/4, 5; 134/10, 22.14, 22.19, 166 R, 201; 510/188; 210/603, 604

(56) References Cited

U.S. PATENT DOCUMENTS

| | | | | |
|---|---|---|---|---|
| 4,357,175 A | * | 11/1982 | Buffington et al. | 134/10 |
| 4,368,059 A | * | 1/1983 | Doerges et al. | 423/228 |
| 4,632,758 A | * | 12/1986 | Whittle | 210/603 |
| 4,888,292 A | * | 12/1989 | Hata | 210/601 |
| 4,996,055 A | * | 2/1991 | Kurasawa | 424/442 |
| 5,154,776 A | * | 10/1992 | Bloch | 134/10 |
| 5,399,267 A | * | 3/1995 | Wang et al. | 210/604 |
| 6,051,518 A | * | 4/2000 | Srivastava et al. | 502/20 |
| 6,325,967 B1 | * | 12/2001 | Strmen | 110/236 |

FOREIGN PATENT DOCUMENTS

JP 59019589 A * 2/1984 ............ C02F/3/28

* cited by examiner

Primary Examiner—William H. Beisner
(74) Attorney, Agent, or Firm—Howard & Howard

(57) ABSTRACT

A method for deodorizing a storage tank having mercaptan residue disposed therein includes the steps of delivering a cleaning material to the storage tank, and absorbing the mercaptan residue from the walls of the tank into the cleaning material. The cleaning material having absorbed the mercaptan is transferred to a recovery vessel. The mercaptan is continuously sparged from the cleaning material with natural gas for continuously and repeated using the cleaning material.

6 Claims, 2 Drawing Sheets

MERCAPTAN DEODORIZING FOR STORAGE TANKS

This application claims priority to provisional patent application 60/146,499, which was filed Jul. 30, 1999.

BACKGROUND OF THE INVENION

The present invention relates to a method for cleaning a chemical storage tank. More specifically, the invention relates to cleaning and deodorizing a storage tank having mercaptan compound residue therein. Malodorous gas compounds are added to natural gas, which has no discernable odor, for providing a means of detecting a gas leak from a gas line. The class of malodorous compounds most widely used is a mercaptan-containing compound (mercaptan). Mercaptans are compounds similar to an alcohol where the oxygen molecule of the hydroxyl group has been replaced with a sulfur molecule and are recognized by their strong skunk-like odor. The addition of mercaptans to natural gas has historically taken place at an end users location such as at a town or large industrial complex. Recent changes in technology have facilitated adding mercaptan compounds to natural gas at the gas generating cite and not at the end users location. At the direction of the Environmental Protection Agency, the mercaptan holding tanks are being removed from the end users locations to prevent leaking.

The mercaptan storage tanks, having large quantities of reusable steel are frequently being recycled. However, upon crushing or shredding a storage tank at a recycling facility, mercaptan residue escapes into the atmosphere prompting complaints and false natural gas leak alarms by local residents. Thus, a need exists for removing mercaptan residue from these storage tanks prior to the recycling operation.

Several examples exist for removing malodorous sulfuric compounds from gases generated from sewage treatment plants, fertilizer plants or the like. One such example is U.S. Pat. No. 4,902,489 to Wantanabe which discloses washing a gas with an organic acid solution and subsequently treating with a lignin-sulfonate solution. A further example is U.S. Pat. No. 4,427,630 Aibe et al. which discloses deodorizing a sulfur containing gas with an absorbent consisting of activated carbon having bromine and an acid supported therein. A further example is U.S. Pat. No. 4,888,292 to Hata which discloses the use of autotrophic bacteria for deodorizing foul smelling substances from waste products. None of the prior art, however discloses a method for deodorizing a storage tank with a bacterial solution that can be continuously and repeatedly reused providing for economical deodorization of storage tanks.

SUMMARY OF THE INVENTION AND ADVANTAGES

The present invention is a method for deodorizing a storage tank having mercaptan residue disposed therein. A cleaning material is delivered to the storage tank. The cleaning material absorbs the mercaptan residue from the walls of the tank into the cleaning material. The cleaning material, having absorbed the mercaptan, is delivered to a recovery vessel. The mercaptan is sparged from the cleaning material with natural gas injected into the recovery vessel.

The advantage of the present invention is the ability to continuously and repeatedly use the cleaning material over a period of months due to the sparging step. The sparging step purges bacteria in the cleaning material of the absorbed mercaptan allowing the bacteria to again absorb mercaptan upon reintroduction to the mercaptan storage tank.

BRIEF DESCRIPTION OF THE DRAWINGS

Other advantages of the present invention will be readily appreciated as the same becomes better understood by reference to the following detailed description when considered in connection with the accompanying drawing wherein.

DETAILED DESCRIPTION OF THE PREFERRED EMBODIMENT

Figure 1:
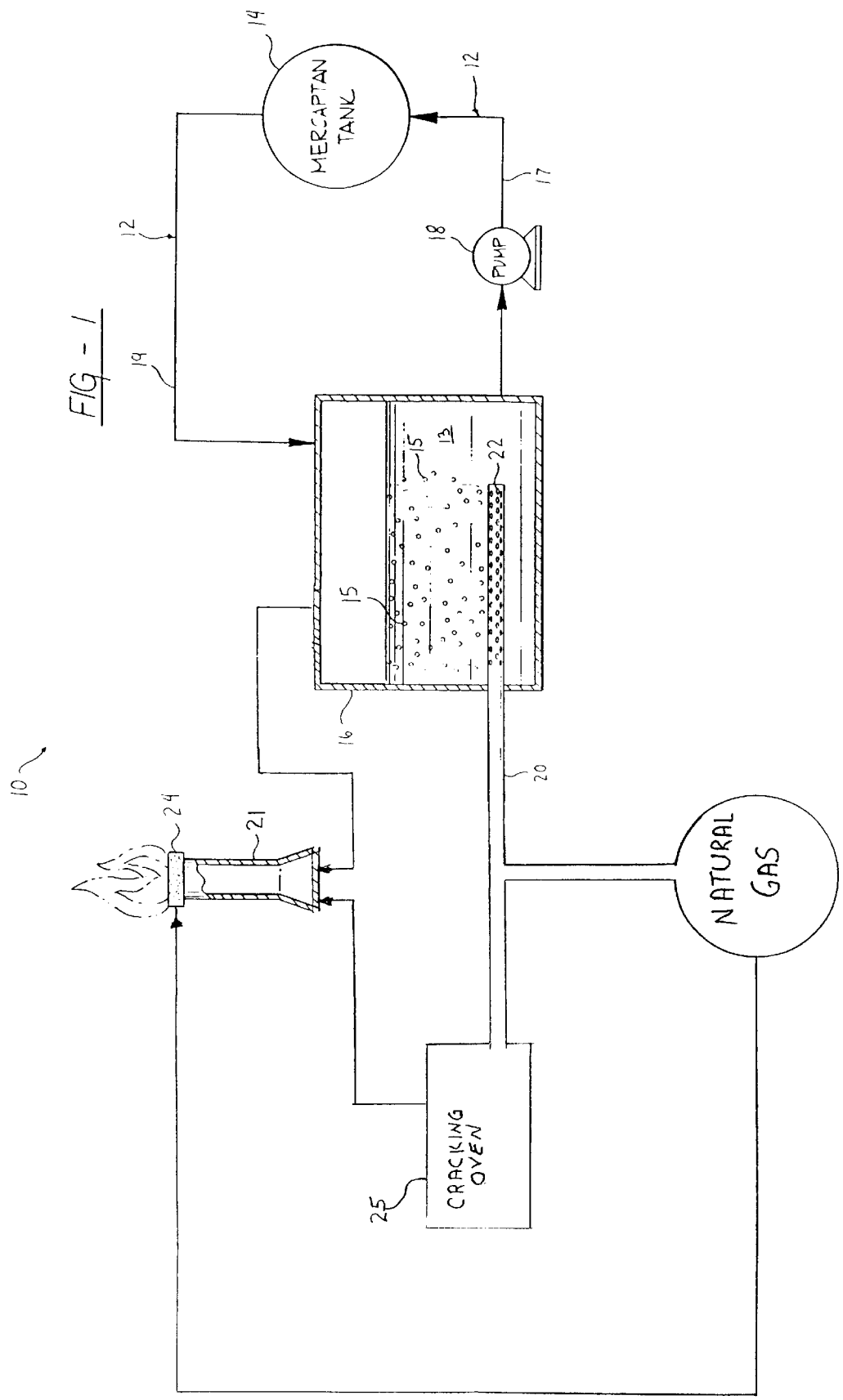
FIG. 1 is a block diagram of the apparatus of the subject invention showing flue with an incinerator.

Referring to FIG. 1, an apparatus for deodorizing a storage tank having mercaptan residue contained therein is shown generally at 10. The apparatus 10 includes a supply line 12 for supplying cleaning material 13 to the storage tank 14, a recovery vessel 16, and a supply of natural gas 15. A method for deodorizing the storage tank 14 having mercaptan residue contained inside includes the steps of delivering the cleaning material 13 to the storage tank 14 and absorbing the mercaptan residue from the walls of the tank 14 into the cleaning material 13. The supply line 12 is connected to the recovery vessel 16 for supplying cleaning material 13 from the recovery vessel 16 to the tank 14. A pump 18 is located in a transfer section 17 of the supply line 12 for transferring the cleaning material 13 from the vessel 16 to the tank 14. However, other equally affective methods for transferring the cleaning material 13 will suffice.

The walls of a commonly used mercaptan storage tank 14 are made of a porous steel and are known to hold mercaptan in the pores even though the tank 14 has been drained of the mercaptan. Thus, it is imperative that the cleaning material 13 contact the walls of the tank 14 to remove the mercaptan from the pores. Accordingly, the cleaning material 13 is most effective as a deodorizer when it fills the entire volume of the tank 14.

The cleaning material 13, having absorbed the mercaptan, is delivered to the recovery vessel 16. For example, the pump 18 provides enough pressure to the cleaning material 13, that upon filling the tank 14, the cleaning material 13, having absorbed the mercaptan, flows from the tank 14 through a return section 19 of the supply line 12 into the recovery vessel 16.

The mercaptan is sparged from the cleaning material 13 with the natural gas 15. Sparging is known as the art of stripping impurities from a liquid with a gas. Stripping the mercaptan from the cleaning material 13 allows the cleaning material 13 to be reused. Thus, cleaning material 13 is continuously circulated from the recovery vessel 16 through the tank 14 and back to the recovery vessel 16 during the deodorizing process.

Natural gas 15 is injected into the recovery vessel 16 from a tube 20 submersed in the cleaning material 13. The tube 20 includes a plurality of apertures 22 spaced apart for dispersing natural gas 15 throughout the cleaning material 13. The dispersion of the natural gas 15 by the apertures 22 provides for the maximum contact area between the gas 15 and the cleaning material 13 enhancing the efficiency of the sparging step. While the cleaning material 13 is continuously circulating, the natural gas 15 is simultaneously stripping the mercaptan from the cleaning material 13 inside the recovery vessel 16. Thus, stripping the mercaptan from the cleaning material 13 allows for the continuous and repeated use of the cleaning material 13.

The cleaning material 13 supplied to the apparatus 10 includes a mixture of mercaptan absorbing bacteria for absorbing the mercaptan from the walls of the tank 14. The bacteria include enzymes that break down the mercaptan from the walls of the tank 14 allowing the mercaptan to be absorbed by the bacteria and, thus, into the cleaning material 13. The bacteria contemplated for use is suspended in a solution which is sold as D-MOLISH by Neutron Industries, Inc. of Phoenix, Ariz. The D-MOLISH is a proprietary liquid containing non-pathogenic bacterial liquid for drain maintenance. An additional solution having suspended bacteria is blended with the D-MOLISH and is sold as Liquid Alive Bacteria (LAB) by Chemical Resources Corp. of Huntington, N.Y. The LAB is a proprietary liquid cleaning preparation consisting of live bacteria for use in cleaning drains and sewer systems. A combination of the two products has proved most effective in cleaning the mercaptan from the storage tanks 14. Optimum concentrations and operating ranges for LAB and for D-MOLISH to meet various deodorization requirements are discussed further herein below.

The preferred operating temperature for the cleaning material 13 is approximately between 70° and 90° F. When the cleaning material 13 drops significantly below 70° F. the cleaning material 13 can lose its effectiveness. When the cleaning material 13 rises significantly above 90° F. the bacteria can start to degrade reducing the mercaptan stripping effectiveness of the cleaning solution. A temperature above 110° F. causes the bacteria to begin dying. To maintain the temperature between 70° and 90° F., the recovery vessel includes an insulated lining 17 with electric heating traces.

The cleaning material 13 includes a citric acid cleaner. The citric acid cleaner both loosens hydrocarbons from the walls of the storage tank 14 and assists deodorizing the tank 14 by providing citrus smell to the cleaning material 13. The citric acid cleaner is preferably a soap based cleaner which further assists removing mercaptan and other impurities from the tank 14 walls. However, it is imperative that the citric cleaner not contain anti-bacterial soap as the mercaptan absorbing bacteria will be destroyed. The citric cleaner contemplated for use is available as Orange Base NI-825 from Neutron Industries, Inc. However, other equivalent citric acid cleaners will suffice.

The cleaning material 13 includes sodium bicarbonate. The preferred pH operating range of the cleaning material 13 is slightly acidic, having a pH between about 7 and 8. To maintain the pH in the preferred range, sodium bicarbonate is added to the cleaning material 13 for reducing acidity.

The contemplated operating range for components of the cleaning material 13 is:

| | |
|---|---|
| D-MOLISH | 45–70% |
| LAB | 25–55% |
| Orange Base NI-825 | 2–7% |
| Sodium Bicarbonate | 2–7% |

LAB, a proprietary liquid cleaning preparation consisting of live bacteria for use in cleaning drains and sewer systems, is known to be an aggressive industrial cleaner, which is typically used in sewage plants. D-MOLISH, a proprietary liquid containing non-pathogenic bacterial liquid for drain maintenance, is known to be a less aggressive cleaner which is typically used in a hospital environment. LAB has a chemical odor while D-MOLISH has a sweet odor. The target concentration of the two bacteria cleaners is chosen to balance the cleaning strength of the cleaning material 13 with the introduction of agreeable odors.

An example of a target ratio for the components of the cleaning material 13 is:

| | |
|---|---|
| D-MOLISH | 45% |
| LAB | 45% |
| Orange Base NI-825 | 5% |
| Sodium Bicarbonate | 5% |

An additional example of a target ratio for the components of the cleaning material 13 is:

| | |
|---|---|
| D-MOLISH | 58% |
| LAB | 35% |
| Orange Base NI-825 | 5% |
| Sodium Bicarbonate | 2% |

The natural gas 15 is vented from the vessel 16 through a flue 21. The vessel 16 is closed except for the flue 21, which is included for venting the natural gas 15 from the vessel 16. As explained above, the natural gas 15, having sparged the mercaptan from the cleaning material 13, allows the cleaning material 13 to be continuously and repeatedly used. Thus, by removing the natural gas 15 from the vessel 16 the mercaptan is removed from the cleaning process.

The natural gas 15 vented from the vessel 16 is incinerated by a flaming device 24. By incinerating the natural gas 15, the gas 15 and the mercaptan are prevented from entering the atmosphere after having been vented from the vessel 16. The flaming device 24 can take the form of a torch or any other equally operative incendiary device as is known in the art of incineration of waste byproducts.

Figure 2:
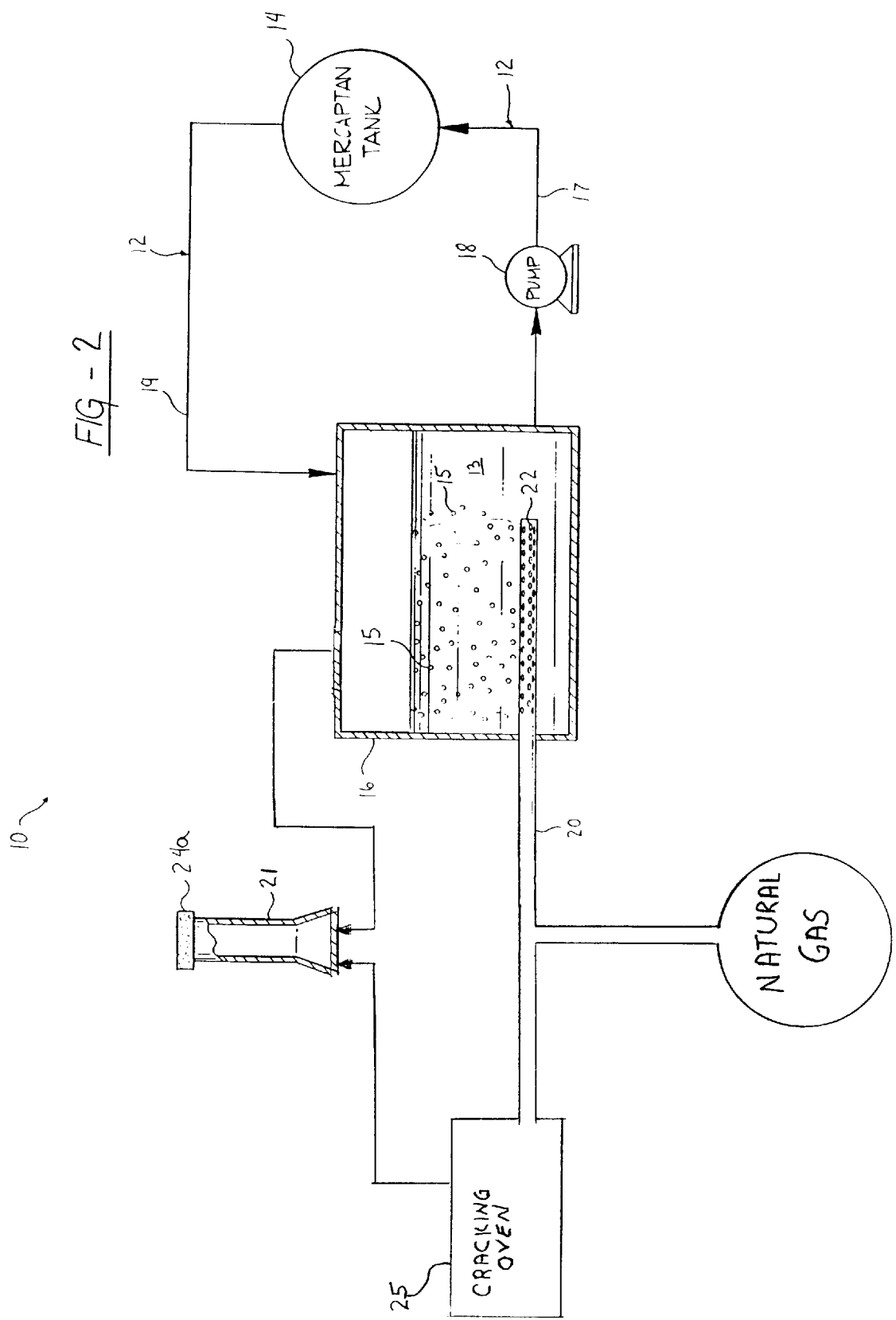
FIG. 2 is a block diagram of the apparatus of the subject invention showing a flue with a filter.

As an alternative to incineration, the natural gas 15 can be filtered upon being vented from the vessel 16. To filter the natural gas 15, the flue 21 includes a filter 24a as shown in FIG. 2. A carbon or charcoal filter has been found to be most effective for preventing the mercaptan containing natural gas 15 from entering the atmosphere after having been vented from the vessel 16. However, any type of filter 24 capable of removing carbon and sulfur based compounds from a gas 15 stream will suffice.

The components associated with the storage tank 14, such as, for example, small valves, fittings, and piping, and the like must also be deodorized in order to be recycled. These components are either removed prior to cleaning the storage tank 14, or are not adequately cleaned during the cleaning process. Therefore, a cracking oven 25, or an equivalent is used to crack the mercaptan compound from the components. The cracking oven 25 must operate at a temperature of approximately 425° C. or above to crack the mercaptan trapped in the components. The cracking process breaks down the mercaptan into lighter compounds that are incinerated or filtered in a common stack 20 with the recovery vessel 16.

The invention has been described in an illustrative manner, and it is to be understood that the terminology, which has been used, is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An apparatus for deodorizing a storage tank having mercaptan residue disposed therein comprising:

a storage tank and a recovery vessel;

a supply line for delivering cleaning material from the recovery vessel to the storage tank to absorb the mercaptan residue from the walls of the tank into the cleaning material;

a line for transferring said cleaning material having the mercaptan absorbed therein from the storage tank to the recovery vessel; and a supply of natural gas for injecting natural gas into the recovery vessel for sparging the mercaptan from said cleaning material.

2. An apparatus as set forth in claim 1 wherein said supply of gas comprises a tube submersed in said cleaning material for injecting natural gas into said cleaning material.

3. An apparatus as set forth in claim 2 wherein said tube includes a plurality of apertures spaced apart for dispersing natural gas throughout said cleaning material.

4. An apparatus as set forth in claim 3 wherein said vessel is closed and includes a flue for venting the natural gas from said vessel.

5. An apparatus as set forth in claim 4 wherein said flue includes a flaming device for incinerating the natural gas.

6. An apparatus as set forth in claim 5 wherein said flue includes a filter for filtering the natural gas.

* * * * *